United States Patent [19]
Moote et al.

[11] Patent Number: 5,868,117
[45] Date of Patent: Feb. 9, 1999

[54] METHOD OF DETERMINING ETHANOL THRESHOLDS IN A FLEXIBLE FUELED VEHICLE

[75] Inventors: Richard K. Moote; Shean Huff, both of Ann Arbor; Mary Joyce, Farmington Hills; Howard W. Krausman, Dexter; Gary L. Seitz, Chelsea, all of Mich.

[73] Assignee: Chrysler Corporation, Auburn Hills, Mich.

[21] Appl. No.: 959,815

[22] Filed: Oct. 29, 1997

[51] Int. Cl.⁶ .................................................. F02D 41/26
[52] U.S. Cl. .......................... 123/486; 123/674; 123/1 A
[58] Field of Search .................................. 123/674, 486, 123/1 A, 494

[56] References Cited

U.S. PATENT DOCUMENTS

| | | | |
|---|---|---|---|
| 4,945,880 | 8/1990 | Gonze et al. | 123/674 |
| 5,150,301 | 9/1992 | Kashiwabara et al. | 123/486 |
| 5,163,407 | 11/1992 | Yoshida et al. | 123/674 |
| 5,255,661 | 10/1993 | Nankee, II et al. | |
| 5,335,637 | 8/1994 | Davis et al. | |
| 5,365,917 | 11/1994 | Adams et al. | |
| 5,381,774 | 1/1995 | Nakajima | 123/674 |
| 5,400,762 | 3/1995 | Fodale et al. | |
| 5,415,145 | 5/1995 | Letcher et al. | |
| 5,435,285 | 7/1995 | Adams et al. | |
| 5,467,755 | 11/1995 | Konrad et al. | |
| 5,497,753 | 3/1996 | Kopera | |
| 5,520,162 | 5/1996 | Rotramel et al. | |

*Primary Examiner*—Erick R. Solis
*Attorney, Agent, or Firm*—Mark P. Calcaterra

[57] ABSTRACT

The present invention provides a method for determining ethanol thresholds for a flexible fuel control system for a motor vehicle capable of operating on more than one type of fuel. Preferably, the ethanol threshold is determined from an off-idle purge-free cell from a matrix of fuel adaptive memory cells normally used to compensate for car-to-car variations in required fueling. The ethanol threshold is periodically reduced to compensate for levels of alcohol creep indicated by the amount of purge-free adaptive memory elevation. If the learned value of percent alcohol content of the fuel is less than the ethanol threshold, gasoline operating parameters are implemented for the internal combustion engine. The off-idle purge-free cell also provides a basis for interpolating an on-board diagnostic (OBDII) ethanol threshold. As such, the OBDII monitors are only enabled if the learned value of percent alcohol content of the fuel is less than the OBDII ethanol threshold.

13 Claims, 1 Drawing Sheet

METHOD OF DETERMINING ETHANOL THRESHOLDS IN A FLEXIBLE FUELED VEHICLE

BACKGROUND OF THE INVENTION

1. Technical Field

The present invention relates generally to fuel control systems and, more particularly, to a method of determining ethanol thresholds for a flexible fuel control system for a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being supplied in proportion to the amount of air to achieve perfect combustion. Likewise, if the air/fuel ratio is greater than stoichiometric, an engine is said to be operating lean, i.e., too much air is being supplied in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

With low concentrations of ethanol in the fuel, it is not necessary to modify the vehicle operation from that of pure gasoline. Also, the Environmental Protection Agency requires on-board diagnostics (OBDII) monitors to be operational at low ethanol concentrations but not at high ethanol concentrations. Therefore, it is necessary to identify ethanol thresholds for delineating between the two (i.e., high and low ethanol) operating environments.

When the ethanol concentration of fuel is learned based on an oxygen sensor feedback system such as that disclosed in U.S. Ser. No. 08/959,797, entitled "Method of Determining the Composition of Fuel in a Flexible Fueled Vehicle" to Nankee II et al. which is hereby expressly incorporated by reference herein, the fueling is modified by the product of a long-term fuel adaptive memory value and an alcohol composition multiplier. This product should be constant for any given ethanol concentration. If the fuel's ethanol concentration is increased gradually, the increase can go undetected if a detection threshold is used that forces the alcohol composition multiplier to reach a fixed value. This gradually undetected increase is referred to as "alcohol creep".

Previously, alcohol composition thresholds were fixed values that assumed the alcohol composition multiplier, which sets engine operating parameters based on the percent alcohol content of the fuel, represented the true alcohol concentration. If the alcohol concentration creeps up and the long-term fuel adaptive memory is elevated, i.e., the multiplicative correction which accounts for vehicle-to-vehicle variation, the increase in alcohol content goes undetected and the OBD II monitors undesirably remain enabled.

Therefore, it would be desirable to provide a system for improving vehicle operation by comparing alcohol thresholds to the product of the alcohol composition multiplier and the adaptive memory, or to decrease the alcohol composition multiplier's threshold as the adaptive memory increases.

SUMMARY OF THE INVENTION

It is, therefore, one object of the present invention to provide a method of determining ethanol thresholds in a flexible fueled vehicle.

It is another object of the present invention to provide a flexible fuel control system which uses an alcohol composition threshold that allows the vehicle to operate on low alcohol concentrations as if it was being fueled with pure gasoline.

It is yet another object of the present invention to provide a flexible fuel control system which uses an alcohol composition threshold that enables OBDII monitors on low alcohol concentrations.

It is still another object of the present invention to provide a method for reducing the alcohol composition threshold as a purge-free adaptive memory of the flexible fuel control system increases such that alcohol creep is limited.

The above and other objects are provided by a method of determining ethanol thresholds in a flexible fuel control system for a flexible fueled vehicle. In accordance with the present invention, the ethanol thresholds are determined from an off-idle purge-free cell from a matrix of fuel adaptive memory cells normally used to compensate for car-to-car variations in required fueling. The ethanol thresholds are reduced based on the amount that the purge-free adaptive memory value becomes elevated due to alcohol creep. Below the threshold, normal gasoline operating parameters are implemented and OBDII functionality is enabled. Above the threshold, vehicle operation is modified based on the alcohol concentration in the fuel and select OBDII monitors are disabled.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
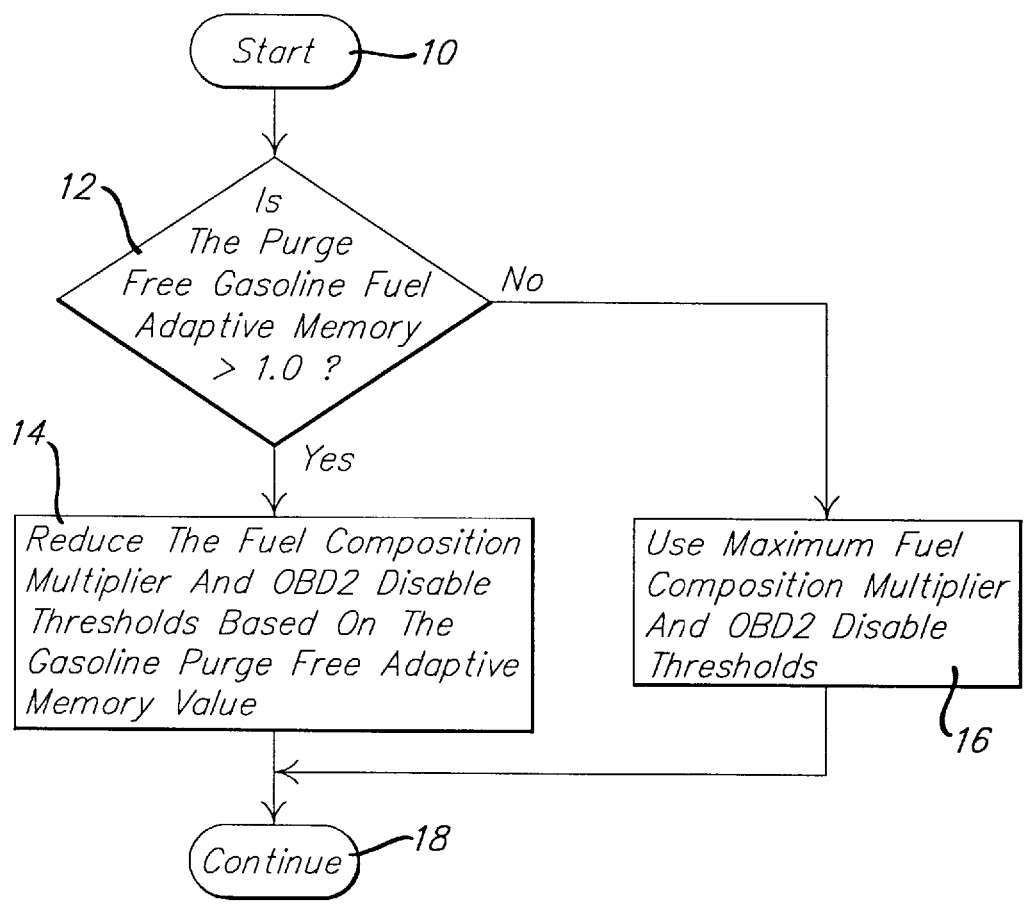
FIG. 1 is a flow chart of a method for determining ethanol thresholds in a flexible fuel control system for a flexible fueled vehicle.

The present invention is directed towards a method for determining ethanol thresholds for a flexible fueled vehicle and a flexible fuel control system employing the determined thresholds. According to the present invention, alcohol composition thresholds are increased for gasoline operation so that errors in the alcohol composition multiplier do not cause false detection of alcohol or falsely disable OBDII monitors. Furthermore, the alcohol composition thresholds are reduced as alcohol creep occurs to protect against high concentrations of undetected alcohol.

When operating on gasoline (rather than on ethanol), a matrix of fuel adaptive memory cells are used to compensate for car-to-car variations in required fueling. This cell matrix modifies calibrated fuel tables to keep the engine running under stoichiometric conditions. This cell matrix also compensates for fuel requirement changes caused by allowing fuel vapors from the fuel vapor management system to enter the engine.

To determine when the changes in the fuel cell matrix are caused by fuel vapors, some cells are updated without enabling the fuel vapor management system. By comparing these vapor-free cells to the remaining cells in the matrix, the amount of fuel vapors present can be estimated. Since these vapor-free cells better represent the true fueling requirements of the engine, they are now used to determine if the fuel composition system has properly identified the fuel as gasoline or if an error has occurred.

When determining the ethanol content of a fuel in a flexible fueled vehicle, there is an initial threshold established based on pure gasoline operation. If the ethanol content updates below this threshold, the assumed ethanol concentration is set to 0% such that errors in the ethanol determination (and commercially available 10% ethanol fuel) will not cause the control system to falsely operate in an ethanol realm. However, this can lead to alcohol creep. That is, if the ethanol content is increased gradually, the ethanol content will always update below the threshold which will continuously reset to 0% ethanol.

Using the vapor-free fuel adaptive memory to modify the ethanol threshold reduces the amount of alcohol creep that can be achieved before it is corrected. To accomplish this, once the threshold is reached, the gasoline adaptive memory cell matrix is cleared so as to remove accumulated creep error from the ethanol determination system. As such, if the percent alcohol content of the fuel is below the ethanol threshold after the initial check of the fuel composition, the fuel is assumed to be close enough to pure gasoline so that normal gasoline operation (i.e., 0% ethanol) is resumed.

Gasoline operation includes decrementing the percent ethanol content value by a calibratable amount (equal to 85%, which forces the percent ethanol content value to 0%) and re-enabling all normal gasoline engine control operations. However, the OBDII monitors are not re-enabled unless a preselected number of gasoline fills have been tabulated since the last ethanol fill. It should be noted that the ethanol threshold is the output from a two-dimensional table which includes the off-idle purge-free cell from the adaptive memory cell matrix described above as the x-input.

At the end of the initial fuel composition check, if the ethanol content of the fuel is greater than an OBDII ethanol threshold, an OBDII monitor pending counter is set to a given calibration. The OBDII ethanol threshold is interpolated from a second two-dimensional table which has the off-idle purge-free cell as the x-input. At the end of the initial check of the fuel composition, if the percent alcohol content of the fuel is less than the OBDII ethanol threshold, the OBDII) monitor pending counter is decremented. Accordingly, the OBDII monitors are disabled (with the exception of the fuel system monitor and the oxygen sensor heater monitor) when the OBDII monitor pending counter is not equal to zero.

Turning now to the drawing figures, FIG. 1 illustrates a method for determining the ethanol threshold based on long-term fuel adaptive memory. The methodology starts at bubble 10 and falls through to decision block 12. In decision block 12, the methodology determines if the purge-free gasoline fuel adaptive memory is greater than a preselected value such as 1.0. If so, the methodology advances to block 14 and reduces the fuel composition multiplier and to OBDII disable thresholds based on the gasoline purge-free adaptive memory value.

If the purge-free gasoline fuel adaptive memory is less than 1.0 in decision block 12, the methodology advances to block 16. In block 16, the methodology sets the fuel composition multiplier and OBDII disable thresholds to their maximum values. From block 16, the methodology advances to bubble 18 where it is returned to start-up bubble 10.

According to the above, the present invention provides a method for determining ethanol thresholds from an off-idle purge-free cell of a matrix of fuel adaptive memory cells normally used to compensate for car-to-car variations in required fueling. The ethanol threshold is periodically reduced to compensate for alcohol creep indicated by the amount of purge-free adaptive memory elevation. If the learned value of the percent alcohol content of the fuel is less than the ethanol threshold, gasoline operating parameters are implemented. The off-idle purge-free cell also provides a basis for interpolating an OBDII disable ethanol threshold. As such, OBDII monitors are only enabled if the learned value of the percent alcohol content of the fuel is less than the OBDII ethanol threshold.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling operating parameters of an internal combustion engine without a fuel composition sensor based on a learned value of percent alcohol content of a fuel comprising:

determining said learned value of percent alcohol content of said fuel;

determining an ethanol threshold according to an off-idle purge-free cell from a matrix of fuel adaptive memory cells;

comparing said learned value to said ethanol threshold; and implementing a first set of operating parameters for said internal combustion engine if said learned value is less than said ethanol threshold and implementing a second set of operating parameters for said internal combustion engine if said learned value is greater than said ethanol threshold.

2. The method of claim 1 wherein said first set of operating parameters includes implementing normal gasoline operation and enabling on-board diagnostic functionality.

3. The method of claim 2 wherein said step of implementing said normal gasoline operation further comprises:

decrementing said ethanol threshold by a calibratable amount;

re-enabling selected normal gasoline engine control operations; and re-enabling on-board diagnostic monitors if a calibratable number of gasoline fills have been tabulated since a last ethanol fill.

4. The method of claim 1 wherein said second set of operating parameters includes modifying vehicle operation based on said learned value and disabling select on-board diagnostic functionality.

5. The method of claim 4 wherein said step of modifying vehicle operation further comprises clearing said matrix of fuel adaptive memory cells so as to remove accumulated alcohol creep error from future determinations of said learned value of percent alcohol content.

6. The method of claim 1 further comprising reducing said ethanol threshold according to a detected level of alcohol creep.

7. The method of claim 6 wherein said level of alcohol creep corresponds to an elevation of said off-idle purge-free cell.

8. The method of claim 7 wherein said off-idle purge-free cell is used to eliminate an influence of purge vapors on a fuel adaptive memory value.

9. The method of claim 1 wherein said ethanol threshold corresponds to an output from a two-dimensional table including said off-idle purge-free cell as an input.

10. The method of claim 1 further comprising enabling on-board diagnostic monitors if said learned value of percent alcohol content of said fuel is less than an on board diagnostics monitor ethanol threshold.

11. The method of claim 10 wherein said on-board diagnostics monitor ethanol threshold is interpolated from a two-dimensional table including said off-idle purge-free cell as an input.

12. The method of claim 1 further comprising:

determining an on-board diagnostic ethanol threshold;

setting an on-board diagnostic monitor pending counter to a given calibration if said learned value of percent alcohol content is greater than said on-board diagnostic ethanol threshold;

decrementing said on-board diagnostic monitor pending counter if said learned value of percent alcohol content is less than said on-board diagnostic ethanol threshold; and pending functionality of on-board diagnostic monitors when said on-board diagnostic monitor pending counter is not equal to zero.

13. The method of claim 12 wherein said on-board diagnostic ethanol threshold is interpolated from a two-dimensional table including said off-idle purge-free cell as an input.

* * * * *